(12) United States Patent
Feng et al.

(10) Patent No.: US 10,720,846 B2
(45) Date of Patent: Jul. 21, 2020

(54) SENSE RESISTOR SHORT DETECTION FOR SWITCHING POWER CONVERTERS

(71) Applicant: DIALOG SEMICONDUCTOR INC., Campbell, CA (US)

(72) Inventors: Guang Feng, Campbell, CA (US); Pengju Kong, Campbell, CA (US); Juyoung Yoon, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 15/399,658

(22) Filed: Jan. 5, 2017

(65) Prior Publication Data

US 2018/0191254 A1   Jul. 5, 2018

(51) Int. Cl.
| | | |
|---|---|---|
| H02M 1/08 | (2006.01) | |
| H02M 3/335 | (2006.01) | |
| H02M 1/32 | (2007.01) | |
| H02M 1/00 | (2006.01) | |

(52) U.S. Cl.
CPC ......... *H02M 3/33515* (2013.01); *H02M 1/08* (2013.01); *H02M 1/32* (2013.01); *H02M 3/33507* (2013.01); *H02M 2001/0009* (2013.01)

(58) Field of Classification Search
CPC ......... H02M 3/33538; H02M 3/33546; H02M 3/33515; H02M 3/33576; H02M 3/33553; H02M 3/33507; H02M 3/33592; H02M 3/33523; H02M 1/12; H02M 1/42; H02M 1/4225; H02M 1/4233; H02M 1/4241; H02M 1/4258; H02M 1/425; H02M 1/42; H02M 2003/1552; H02M 2001/4283; H02M 2001/4291

USPC .. 363/20, 21.04, 21.05, 21.07, 21.08, 21.09, 363/21.1, 21.11, 21.12, 21.13, 21.15, 363/21.16, 21.17, 21.18

See application file for complete search history.

(56) References Cited

U.S. PATENT DOCUMENTS

| | | | | |
|---|---|---|---|---|
| 2007/0114950 A1* | 5/2007 | Matsumura | ....... | H02M 3/33507 315/274 |
| 2009/0128209 A1* | 5/2009 | Chu | ......... | H03K 7/08 327/177 |
| 2013/0147457 A1* | 6/2013 | Kim | ...... | H02M 3/158 323/311 |

(Continued)

FOREIGN PATENT DOCUMENTS

CN    103227569    7/2013

OTHER PUBLICATIONS

Op-amp Comparator. (2016). Retrive from http://www.electronics-tutorials.ws/opamp/op-amp-comparator.html.*

*Primary Examiner* — Bryan R Perez
(74) *Attorney, Agent, or Firm* — Haynes and Boone, LLP

(57) ABSTRACT

Systems, devices, and methods are provided to enable power converters to use two or more sensing elements to reliably detect a short circuit (or soft-short circuit) existing in the power converter and distinguish these conditions from other operating conditions, such as low voltage conditions or normal operating conditions. The disclosed embodiments enable the accurate detection of fault conditions, such as short circuits or soft short conditions, using a number of sensing elements, such as sense resistors and the inherent resistance of switching devices, while preventing the detection of false positives due to other factors such as low input voltage.

10 Claims, 7 Drawing Sheets

(56) References Cited

U.S. PATENT DOCUMENTS

| | | | |
|---|---|---|---|
| 2013/0194026 A1* | 8/2013 | Ivankovic | H03K 17/102 |
| | | | 327/427 |
| 2014/0016376 A1* | 1/2014 | Gao | H02M 3/33507 |
| | | | 363/21.17 |
| 2016/0056704 A1* | 2/2016 | Deboy | H02M 3/33592 |
| | | | 363/21.13 |
| 2016/0081148 A1* | 3/2016 | Liang | H05B 33/089 |
| | | | 324/414 |

* cited by examiner

SENSE RESISTOR SHORT DETECTION FOR SWITCHING POWER CONVERTERS

TECHNICAL FIELD

This application generally relates to power converters, and more particularly to power converters having a current sense resistor for sensing current load on the power converter.

BACKGROUND

The widespread use of mobile electronic devices such as smartphones and tablets has created a need in the art for compact and efficient switching power converters for recharging the batteries of these devices. A flyback switching power converter is typically provided as the charger for a mobile device as its transformer provides safe isolation from AC household current. The power output of the converter needs to be controlled, however, to avoid or prevent damage to devices connected to the converter or to the converter itself.

Conventional flyback converters typically provide output regulation using a controller, which controls the ON and OFF state of a power switch. The controller regulates an output voltage (or current) by cycling the power switch responsive to a number of signals to control the operation of the power switch. One of those signals may be derived from sensing the current through the power switch when the power switch is in the ON state by in turn sensing the voltage across a sense resistor in series with the power switch such that the power switch current flows through the sense resistor. The primary winding current (which is the same as the power switch current) is then proportional to the voltage drop of the sense resistor and may be represented by a voltage, V_Isense, as shown in FIG. 1 for a cycle of a power switch (S1).

When the controller places an NMOS power switch (S1) transistor in the ON state at time t0, the drain voltage for the power switch (V_DRAIN_S1) goes low to ground. The primary winding current flows through the power switch and the sense resistor, developing the sense resistor voltage (V_Isense) signal. The controller senses the peak primary winding current by sensing the V_Isense. In normal operation, the controller employs a peak current threshold (V_I-Peak) to determine the proper moment to place the power switch back into the OFF state by attempting to determine when the current through power switch reaches the peak current threshold. But if the sense resistor is shorted (or soft-shorted) due to a fault on the sense resistor, V_Isense will never reach the desired peak current threshold. Instead, the voltage across the sense resistor (V_Isense) would barely increase above ground as shown in FIG. 1 in the case of a soft-short circuit (very low impedance) for the sense resistor. In the case of a hard short circuit, this voltage would stay grounded. Should the controller continue to maintain the power switch on, the primary winding current will continue to increase such that the power switch (or other components) may be harmed by the excess current, resulting in a permanent failure of the power switch. Moreover, such a large primary winding current will tend to drive the output voltage for the power converter out of regulation. It is thus conventional for the controller to employ a maximum on-time timer that times a maximum on-time period starting when the power switch is switched on at time t0. In FIG. 1, the maximum on-time period extends from time t0 to a time t1. Should the maximum on-time period expire without the peak current threshold being reached, the power converter detects a sense resistor short fault condition and enters, for example, a reset operation.

Although such a method can detect short circuit conditions at the sense resistor, it can also indicate false positives (e.g., indicate a short circuit that does not actually exist) under a number of conditions, because the rate of rise of the S1 switch current is directly affected by the rectified input voltage to the converter. For example, a brief drop on the AC mains voltage from which the rectified input voltage is obtained may cause the V_Isense voltage to ramp up more slowly such that it does not cross the peak current threshold prior to expiration of the maximum on-time period.

Accordingly, there is a need in the art for improved detection of sense resistor short conditions in switching power converters.

SUMMARY

To address the need in the art for improved detection of sense resistor short conditions, a controller is provided that monitors the voltage across the power switch as well as the voltage across the sense resistor during the maximum on-time period for the power switch. Should the sense resistor voltage not exceed a first peak current threshold voltage during the maximum on-time period, a sense resistor short is suspected. But this sense resistor short condition is distinguished from a low input voltage condition by exploiting the finite on-resistance of the power switch transistor. Although the power switch ideally has no resistance when switched on, its implementation as a power switch transistor will always have some finite on-resistance. To exploit this finite on-resistance, the controller monitors the voltage across the power switch transistor during the maximum on-time period and compares this voltage to a second peak current threshold voltage. This second peak current threshold voltage equals the expected voltage across the power switch transistor based upon a product of the desired peak current and the finite on-resistance for the power switch transistor.

The voltage across the power switch transistor will be denoted herein as the "power switch voltage" for brevity. If the power switch transistor is an NMOS transistor, the power switch voltage is the drain-to-source voltage for the NMOS power switch transistor. Similarly, if the power switch transistor is a bipolar junction transistor (BJT), the power switch voltage is the collector-to-emitter voltage across the BJT power switch. Regardless of the type of power switch transistor used in a particular embodiment, the controller distinguishes a sense resistor short from a low input voltage condition by determining if the power switch voltage exceeds the second peak current threshold voltage during the maximum on-time period. If both the current sense resistor voltage is less than the first peak current threshold voltage and the power switch voltage is greater than the second peak current threshold voltage, a sense resistor short fault is confirmed by the controller. Conversely, if both the current sense resistor voltage is less than the first peak current threshold voltage and the power switch voltage is less than the second peak current threshold voltage, then a low input voltage condition is confirmed by the controller. This is quite advantageous in that such a low input voltage condition would have led to a false positive detection of a sense resistor short in a conventional controller.

These and additional advantageous features of the disclosed embodiments may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
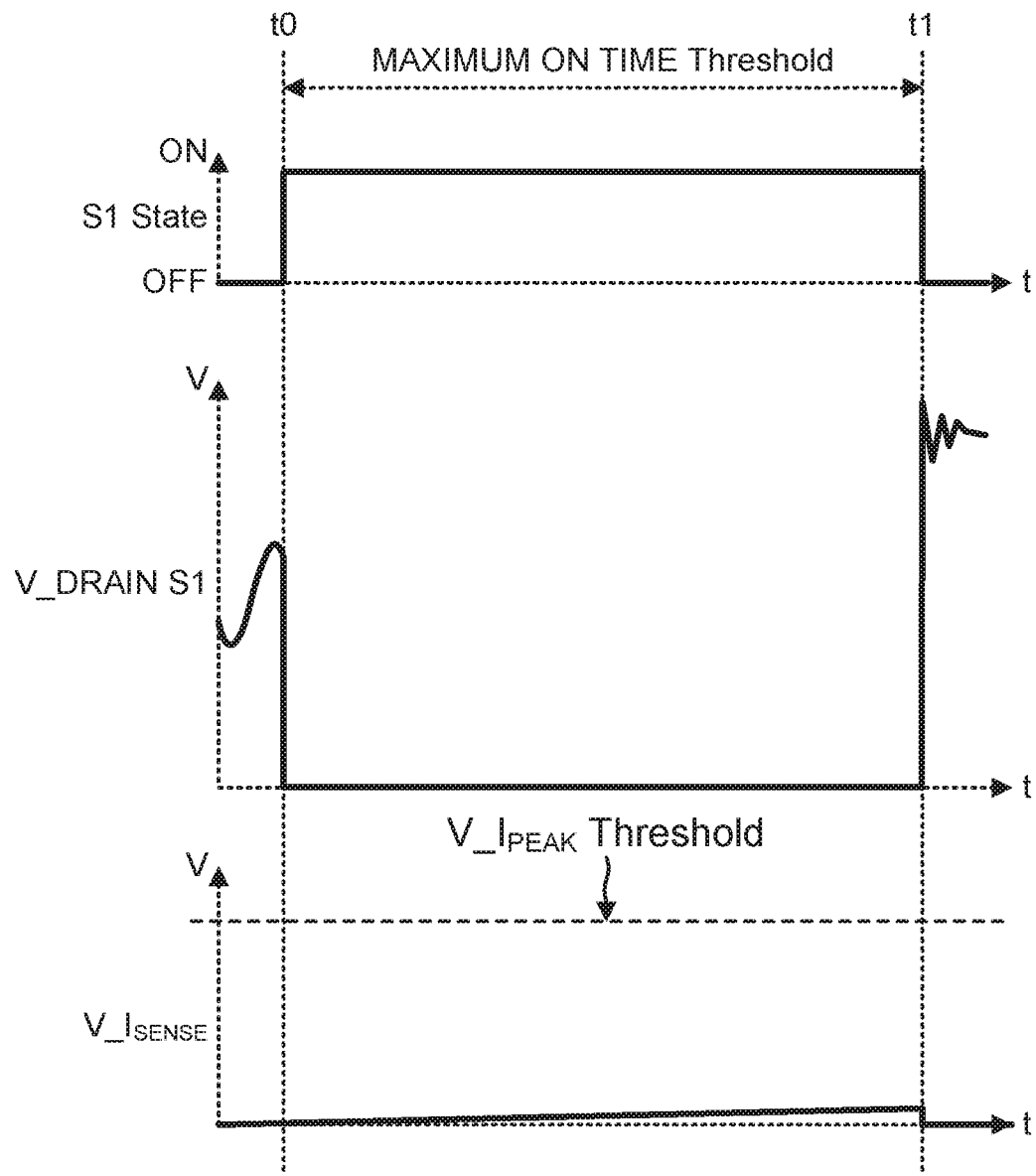
FIG. 1 is a time-domain waveform diagram that illustrates waveforms for a conventional flyback converter with a current sensing resistor.

Systems, devices, and methods are provided that reliably detect a sense resistor short circuit (or soft-short circuit) so as to distinguish these conditions from other operating conditions. The disclosed embodiments enable the accurate detection of fault conditions, such as short circuits or soft short conditions, using a number of sensing elements, such as the sense resistor and the inherent resistance of the power switch transistor while preventing the detection of false positives due to other factors such as low input voltage. Being able to detect a short circuit failure of the sense resistor allows fast shut-down before converter over-current-induced failure occurs (e.g., the controller keeps trying to ramp up the current through the power switch transistor because a short of the current sense resistor provides false information to the controller). Thus, sense resistor short circuit detection according to one or more embodiments avoids destruction of components in the switching power converter such as the power switch transistor in the event of a sense resistor becoming shorted (e.g., physical shorts across the resistor or self-failure shorts in the sense resistor itself due to such causes as overheating from operation in ambient temperature above the maximum specified). The disclosed controller improves such short circuit detection by distinguishing low input voltage conditions from an actual short circuit so that the controller does not mistakenly shut down under less than ideal power delivery conditions, such as may occur due to, for example, substandard delivery from the power grid, AC line voltage experiencing brown out conditions, missing input line cycles, or being subjected to other brief disruptions in the AC input voltage source. By avoiding such false positive detections of short circuit conditions, the controller protects the switching power converter components from damage without interfering with normal operation of the power converter in low voltage conditions by falsely detecting such low input voltage conditions as a sense resistor short.

One principle of the disclosed embodiments is to compare voltage and current conditions of various sensing elements (e.g., one or more current sense resistors, or the inherent resistance (e.g., $R_{DS(on)}$) of one or more switches) and, based on the comparison of conditions between at least two different sensing elements, make a determination that distinguishes one type of fault condition from another. The following discussion will be directed to the controller for a flyback converter but it will be appreciated that the sense resistor short detection techniques disclosed herein may be widely applied to other types of switching power converters such as a buck converter or a buck-boost converter. In one embodiment, the principle is applied to distinguish a short of the current sense resistor from low input voltage conditions at the power switch; the principle could also be used to distinguish a short condition of the power switch. In another embodiment, more than two sensing elements (e.g., current sense resistor and $R_{DS(on)}$ of the power switch) could be used, for example, by connecting more than two sense elements in series and comparing all their voltage drops to determine which, if any, indicate a sense resistor short condition.

Figure 2A:
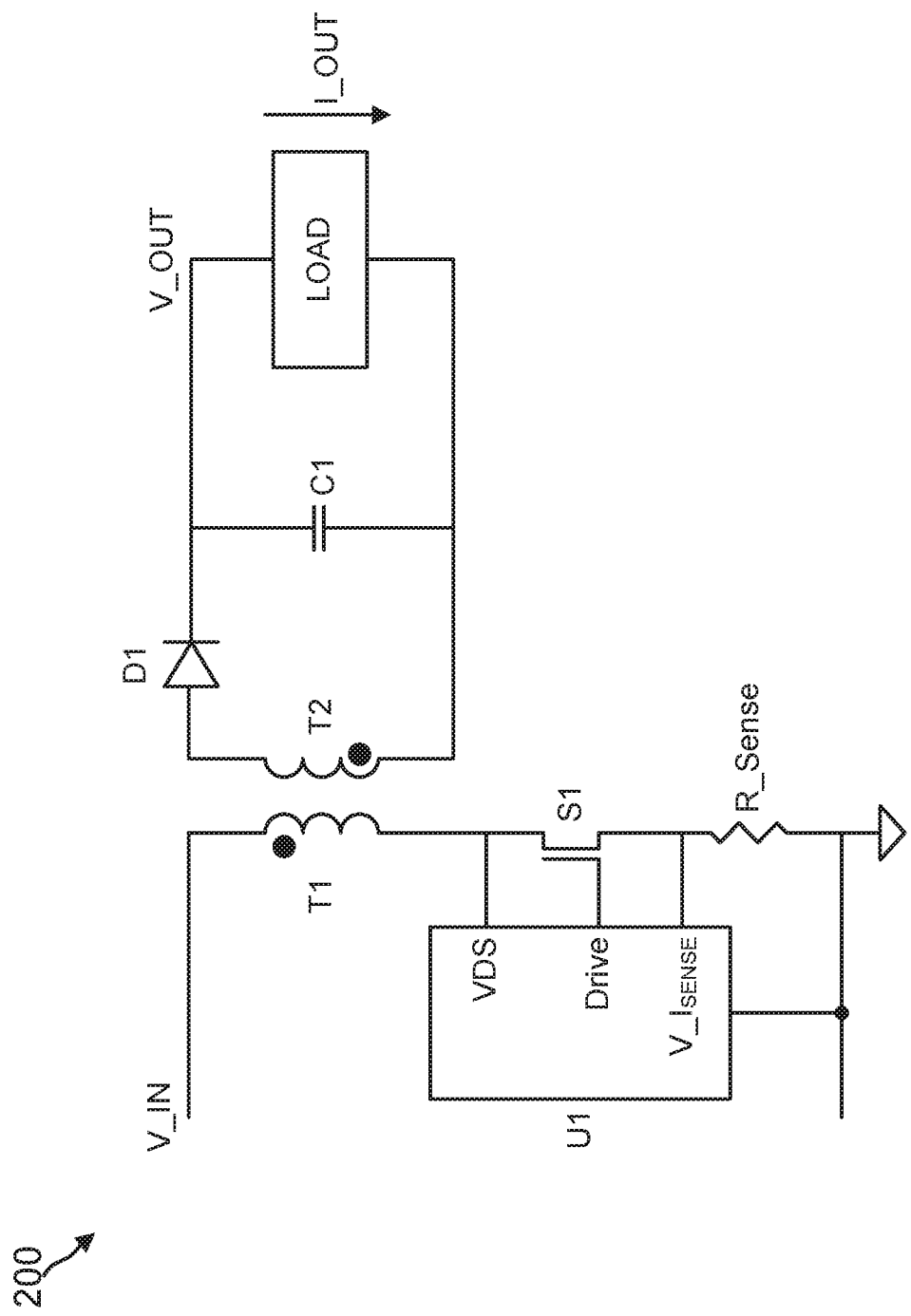
FIG. 2A is a diagram of a flyback converter in accordance with an embodiment.

FIG. 2A illustrates a flyback converter 200 in accordance with an embodiment. Flyback power converter 200 includes a transformer T1 having a primary winding T1 connected to an input voltage V_IN, which may be derived, for example, from the rectification of an AC mains voltage. The primary winding T1 is in series with an NMOS power switch transistor. However, it will be appreciated that the sense resistor short detection techniques disclosed herein are independent of the type of power switch transistor and thus may be applied to alternative embodiments in which the power switch transistor is a bipolar junction transistor (BJT) power switch. A primary controller U1 is configured to control the on state and the off state of power switch S1 so as to regulate the output voltage (V_OUT) or the output current (I_OUT) supplied to a load coupled to a secondary winding T2 of the transformer. Flyback converter 200 includes a current sense resistor, R_Sense, connected in series with the power switch so the same current that flows through the power switch when the power switch is turned on also flows through R_Sense. An output stage for flyback converter 200 includes a diode D1 and an output capacitor coupled to the secondary winding T2 of the transformer. It will be appreciated that diode D1 may be replaced by a synchronous rectifier switch in alternative embodiments.

Figure 2B:
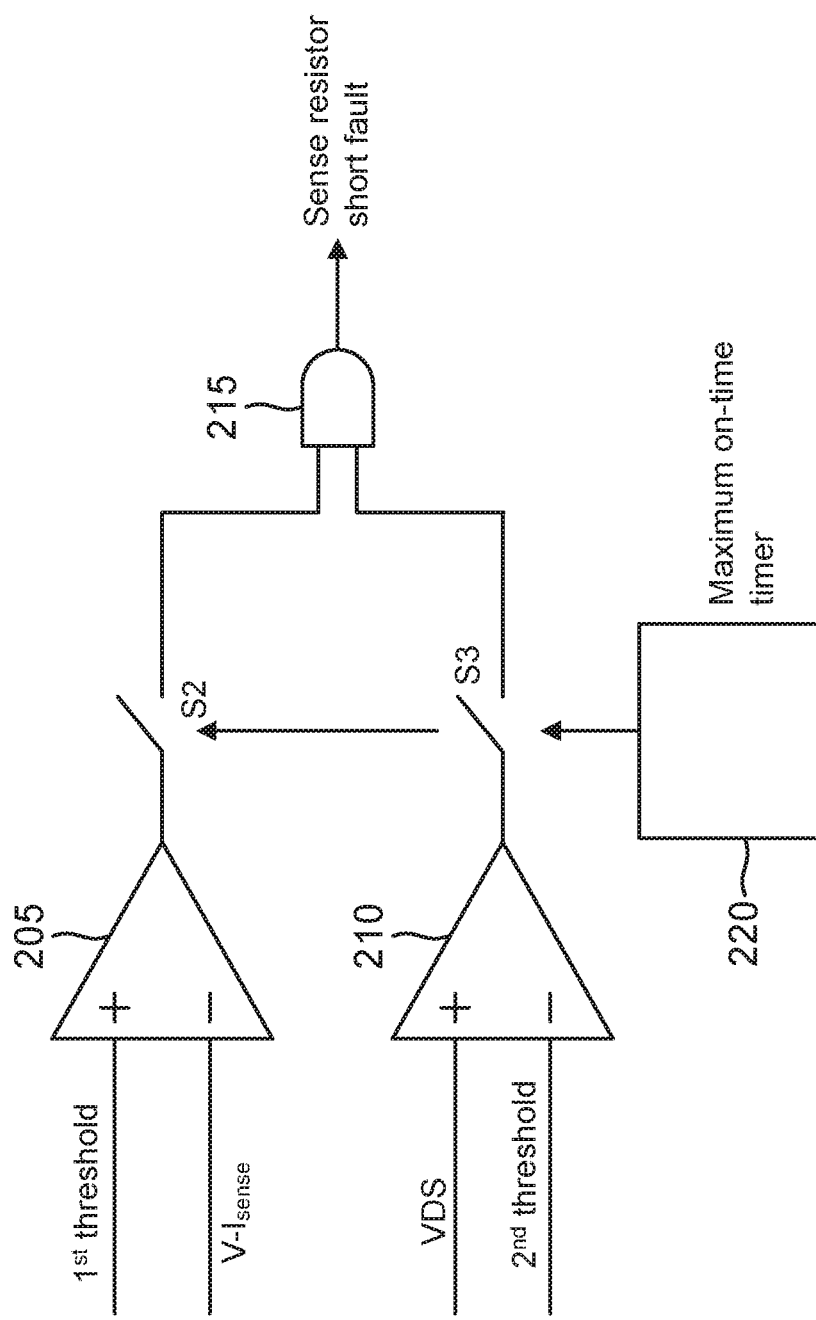
FIG. 2B is a circuit diagram for the sense resistor short detection circuitry in the controller of FIG. 2A.

Controller U1 includes a $V_{DS}$ input connected to the drain of the power switch transistor so as to provide a voltage representative of the drain-source voltage across the power switch transistor. In addition, controller U1 also includes a V_Isense input connected to a terminal of the current sense resistor R_Sense that also couples to the source of the power switch transistor. Additional features of controller U1 are shown in FIG. 2B. For example, controller U1 may include a first comparator 205 that will drive a binary output high to a power supply voltage if the V_Isense voltage across the current sense resistor is less a first peak current threshold voltage (1$^{st}$ threshold). If the V_Isense voltage is greater than the first threshold voltage, the output of first comparator 205 is grounded. A second comparator 210 compares the power switch voltage $V_{DS}$ to a second peak current threshold voltage (2$^{nd}$ threshold) and drives its output signal to a binary high value (e.g., the power supply voltage for controller U1) if $V_{DS}$ is greater than the second threshold voltage. Conversely, the output of second comparator 210 is grounded if $V_{DS}$ is less than the second threshold voltage. It will be appreciated that the comparators 205 and 210 may be implemented in either the analog or digital domains.

The output signals for comparators 205 and 210 are sampled at the end of the maximum-on time period as timed by a maximum on-time timer 220. For example, maximum-on time timer 220 may close sampling switches S2 and S3 to sample the comparator output signals at the conclusion of the maximum on-time period. A logic gate such as an AND gate 215 processes the comparator output signals as sampled at the end of the maximum on-time period to determine whether a sense resistor short fault condition exists. If both the sense resistor voltage V_Isense is less than the first threshold voltage and $V_{DS}$ is greater than the second threshold voltage, the output of AND gate 215 will be true to indicate the presence of a detected sense resistor short condition. If, however, the sense resistor voltage remains below the first threshold voltage but $V_{DS}$ does not exceed the second threshold, a low input voltage condition instead of a sense resistor short is detected. For example, another AND gate (not illustrated) could perform a logical AND of the output signal from comparator 205 and an inverted version of the output signal of comparator 210 to indicate the presence of the low input voltage condition as opposed to an actual sense resistor short condition.

Figure 3:
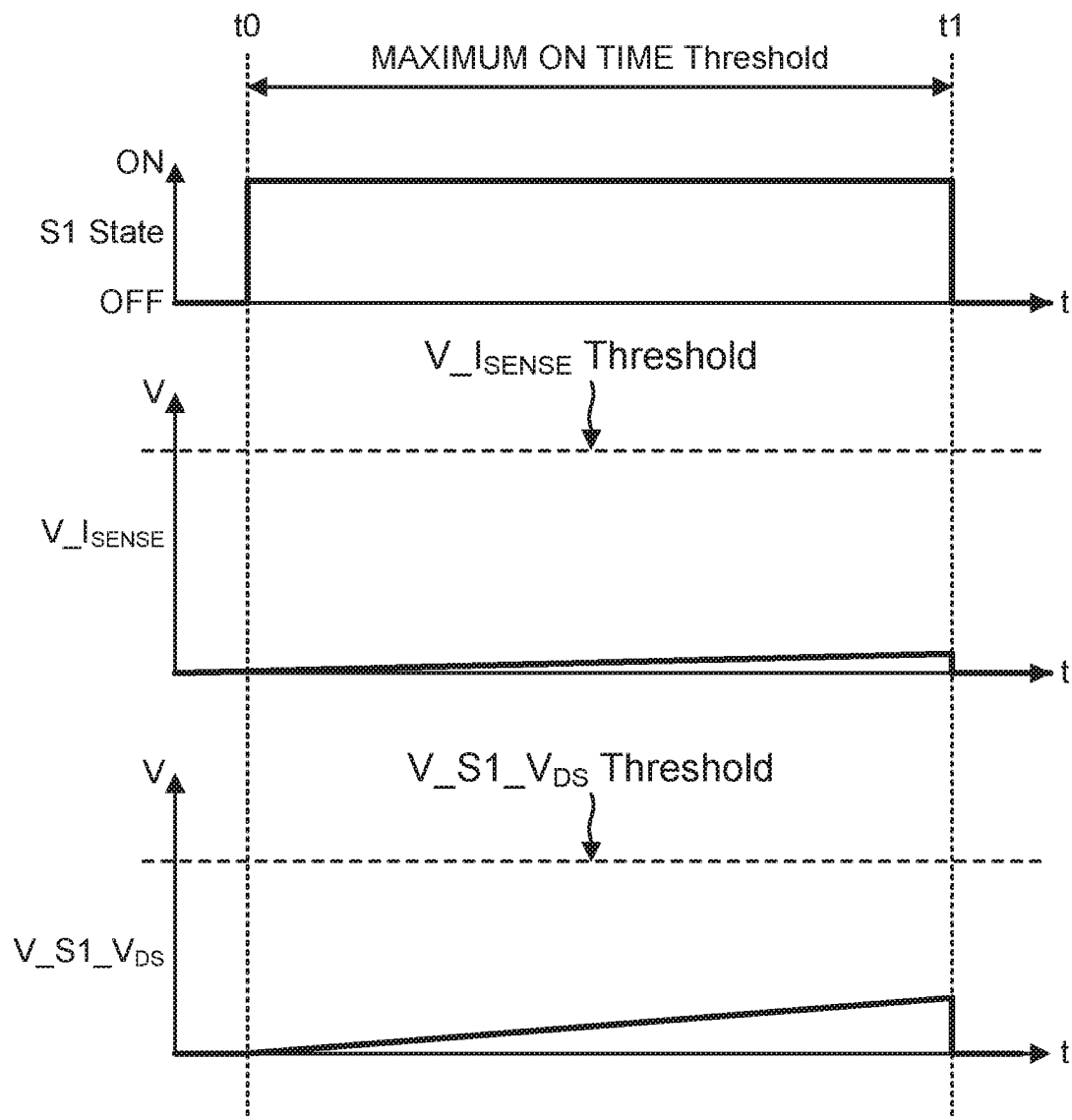
FIG. 3 is a time-domain waveform diagram that illustrates a first set of waveforms for a flyback converter according to an embodiment.

A low input voltage condition is illustrated in FIG. 3 during a maximum on-time period for the power switch transistor Sl. The V_Isense voltage represents the current through switch S1 and thus through current sense resistor (assuming the absence of a short circuit) according to Ohm's law using the resistance of R_Sense as a proportionality constant: V_Isense=R_Sense×(current through switch S1). Due to the low input voltage, V_Isense never crosses the first peak current threshold voltage (V_Isense threshold) during the maximum on-time period. Similarly, the power switch voltage $V_{Ds}$ represents the current through switch S1 as multiplied by the power switch's on-resistance $RDS_{ON}$. Even if the variation of the $RDS_{ON}$ from device to device and across the operating temperature range is too large to rely on the $V_{DS}$ voltage to be used to provide a tightly regulated output voltage, the $V_{DS}$ voltage is useful to disambiguate a slow ramp of the V_Isense signal caused by a short circuit of R_Sense from a slow ramp of the V_Isense signal caused by a low input voltage. Since the current through the power switch transistor is not large due to the low input voltage, the power switch voltage V_S1_$V_{Ds}$ in FIG. 3 does not exceed the second threshold voltage during the maximum on-time period. This low value for the power switch voltage indicates that the low voltage across the sense resistor is not due to short circuit but instead results from the low input voltage.

Figure 4:
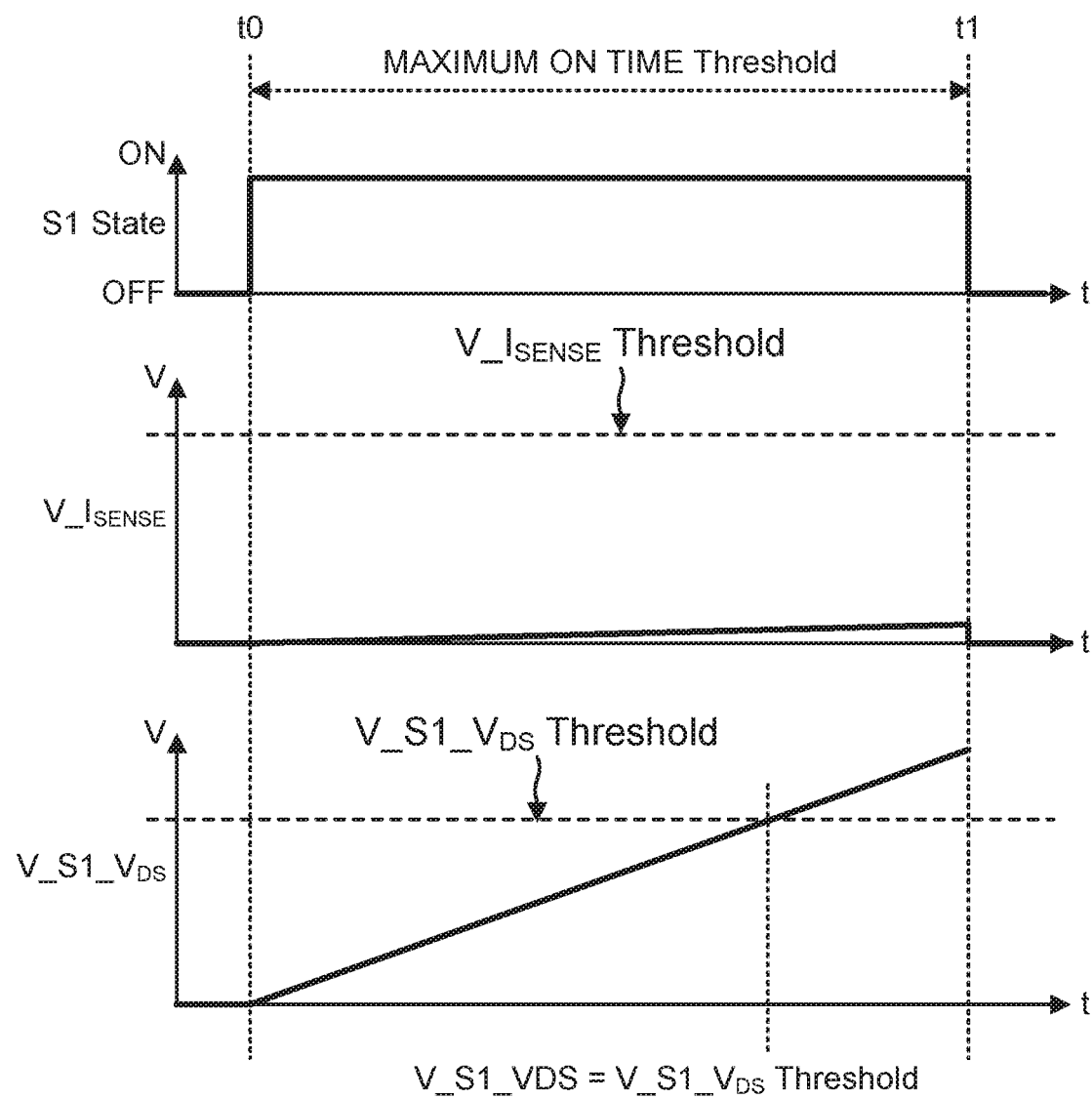
FIG. 4 is a time-domain waveform diagram that illustrates a second set of waveforms for a flyback converter according to an embodiment.

In contrast, an actual soft-short circuit exists across the sense resistor during the maximum on-time period of FIG. 4. The power switch transistor S1 is maintained on during the maximum on-time period while the voltage across the sense resistor (V_Isense) does not exceed the first threshold voltage as also shown in FIG. 3. But the high current due to the sense resistor short circuit causes the power switch voltage V_S1_$V_{DS}$ to exceed the second threshold voltage prior to the expiration of the maximum on-time period. The comparison of the power switch voltage to the second threshold voltage thus enables the controller U1 to distinguish between a sense resistor short circuit condition and a low sense resistor voltage resulting from a low input voltage condition.

Figure 5:
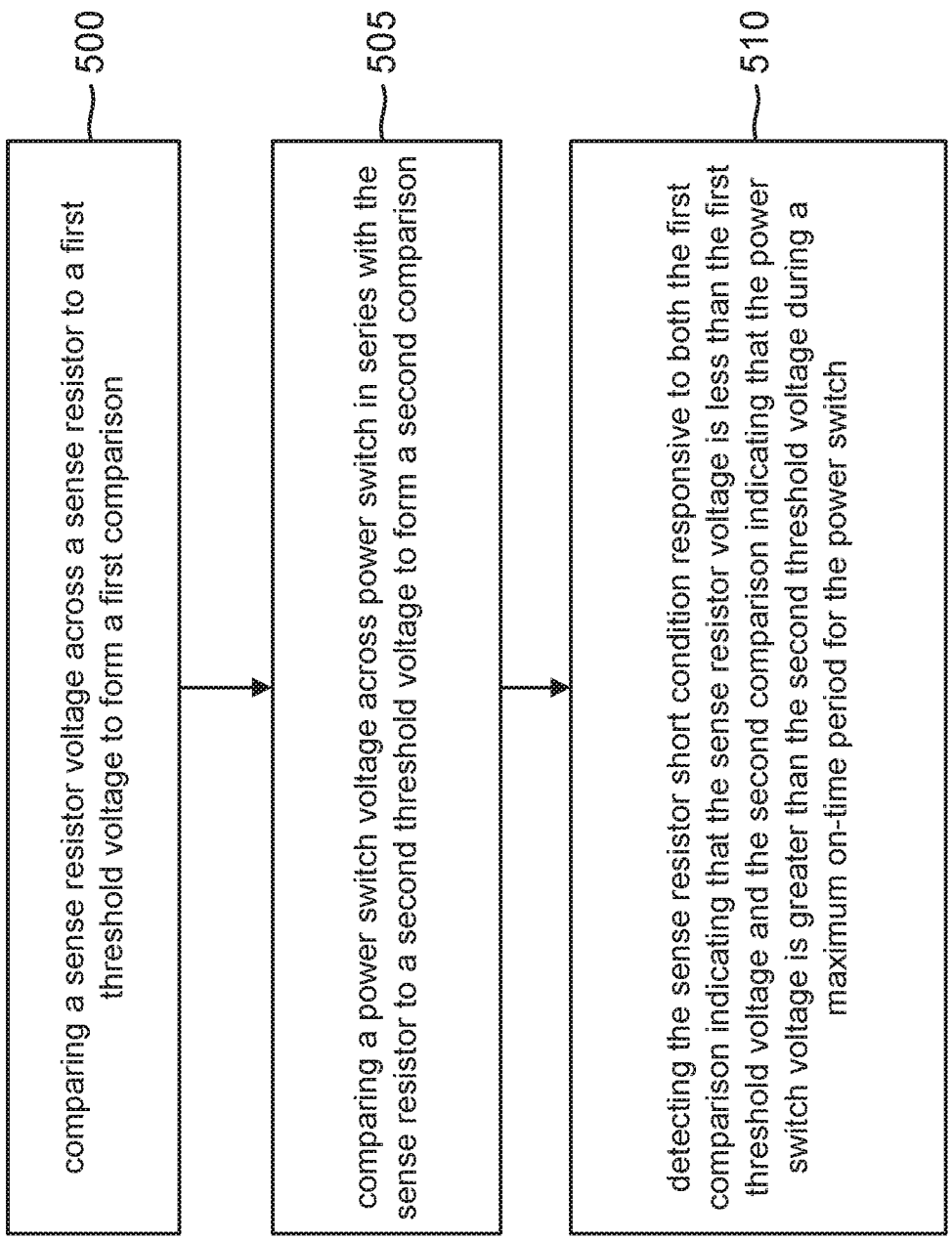
FIG. 5 is a flowchart for an example method of operation in accordance with an embodiment.

A method of operation for controller U1 will now be discussed with regard to the flowchart shown in FIG. 5. The method includes an act 500 of comparing a sense resistor voltage across a sense resistor to a first threshold voltage to form a first comparison. The comparison by comparator 205 is an example of act 500. In addition, the method includes an act 505 of comparing a power switch voltage across a power switch in series with the sense resistor to a second threshold voltage to form a second comparison. The comparison by comparator 210 is an example of act 505. Finally, the method includes an act 510 of detecting a sense resistor short condition responsive to both the first comparison indicating that sense resistor voltage is less than the first threshold voltage and the second comparison indicating that the power switch voltage is greater than the second threshold voltage during a maximum on-time period for the power switch. The outputs of comparators 205 and 210 both being true when sampled at the end of the maximum on-time period as timed by timer 220 is an example of act 510.

Figure 6:
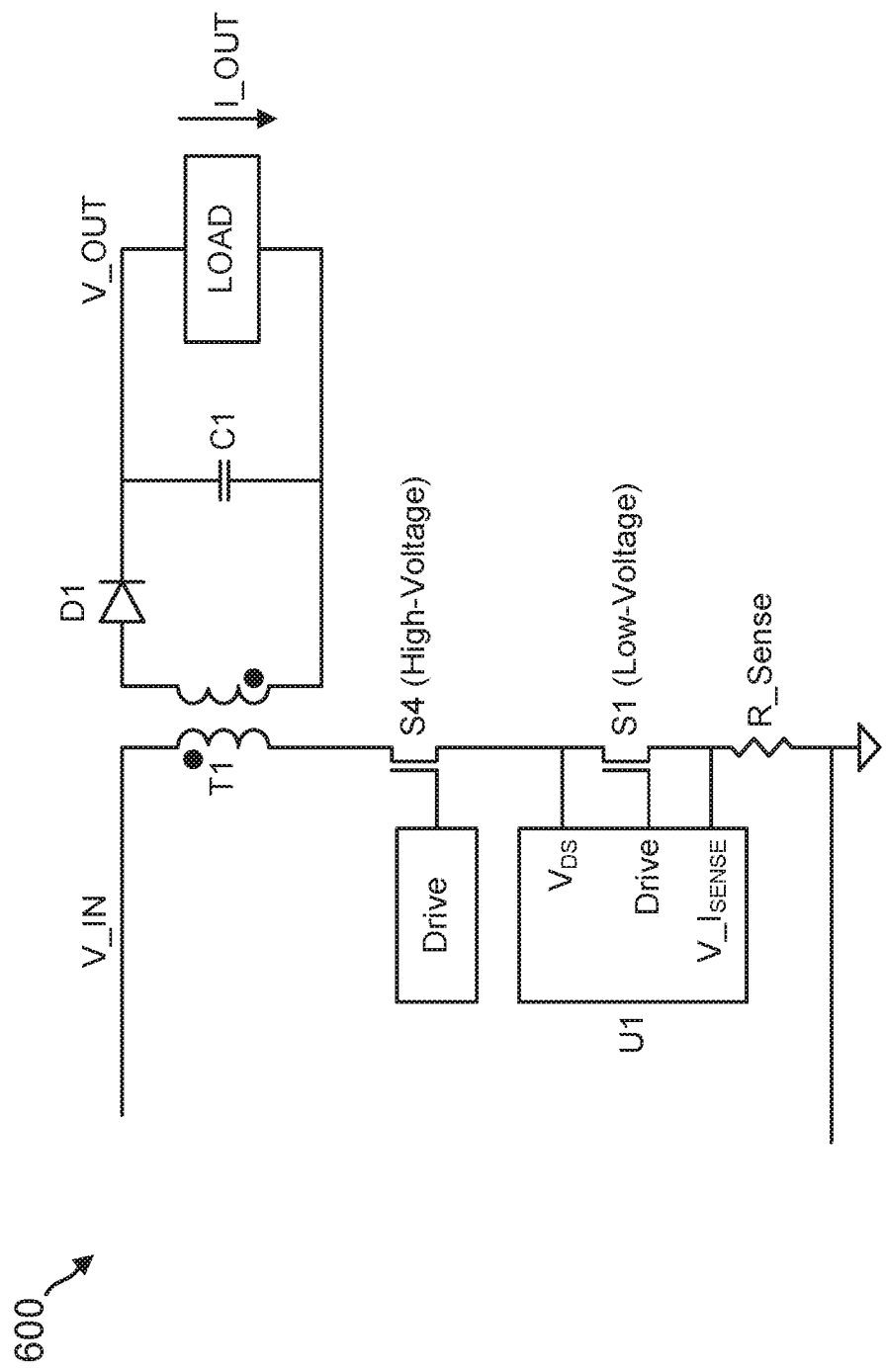
FIG. 6 is a diagram of a flyback converter in accordance with another embodiment.

Referring again to flyback converter 200, it will be appreciated that numerous alternative embodiments may be implemented that exploit the comparison of the power switch voltage and the sense resistor voltage during the maximum on-time period for the power switch. For example, a flyback converter 600 shown in FIG. 6 includes a cascode switch S4 coupled between the power switch S1 and the primary winding T1. The remaining components are as discussed with regard to flyback converter 200. The cascode switch S4 is advantageous in that the drain voltage of power switch S1 in flyback converter 200 will tend to increase dramatically in voltage upon the opening of the power switch S1. But circuitry such as comparator 210 in controller U1 may not be able to accommodate such a relatively high voltage. Controller U1 cycles the power switch S1 and cascode switch S4 simultaneously such that it is the drain of cascode switch S4 that is charged with the relatively large voltage upon the opening of these switches. Components in controller U1 such as comparator 210 may thus be constructed from relatively-small transistors, which reduces manufacturing costs.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A controller for a power switch transistor in a switching power converter comprising: a first comparator for comparing a sense resistor voltage across a sense resistor in series with the power switch transistor to a first threshold voltage to form a first comparator output signal;

a second comparator for comparing a power switch voltage across the power switch transistor to a second threshold voltage to form a second comparator output signal;

a maximum on-time timer configured to time a maximum on-time period for the power switch transistor; and a controller including a logic circuit configured to detect a short circuit condition for the sense resistor responsive to the first comparator output signal indicating that the sense resistor voltage is less than the first threshold voltage at an expiration of the maximum on-time period and the second comparator output signal indicating that the power switch voltage is greater than the second threshold voltage at the expiration of the maximum on-time period, wherein the logic circuit is further configured to detect a low input voltage condition for the switching power converter responsive to the first comparator output signal indicating that the sense resistor voltage is less than the first threshold voltage at the expiration of the expiration of the maximum on-time period and the second comparator output signal indicating that the power switch voltage is less than the second threshold voltage at the expiration of the maximum on-time period, and wherein the controller is further configured to shut down operation of the switching power converter in response to a detection of the short condition for the sense resistor.

2. The controller of claim 1, wherein the first comparator is configured to assert the first comparator output signal to a binary one state responsive to the sense resistor voltage being less than the first threshold voltage.

3. The controller of claim 1, wherein the second comparator is configured to assert the second comparator output signal to a binary one state responsive to the power switch voltage being greater than the second threshold voltage.

4. The controller of claim 1, wherein the controller is a primary-side controller for a flyback converter.

5. The controller of claim 1, wherein the power switch transistor is an NMOS power switch transistor, and wherein the second comparator is configured to receive the power switch voltage as a voltage across the NMOS power switch transistor.

6. The controller of claim 1, wherein the controller is further configured to cycle a cascode power switch in series with the power switch transistor.

7. The controller of claim 1, wherein the second threshold voltage equals a product of an on-resistance of the power switch transistor and a peak current of the power switch transistor.

8. The controller of claim 1, wherein the first threshold voltage equals a product of a resistance of the sense resistor and a peak current of the power switch transistor.

9. A method of detecting a sense resistor short condition and a low input voltage condition in a switching power converter, the method comprising:
comparing a sense resistor voltage across a sense resistor to a first threshold voltage to form a first comparison signal;
comparing a power switch voltage across a power switch transistor in series with the sense resistor to a second threshold voltage to form a second comparison signal;
timing a maximum on-time period for the power switch transistor;
detecting the sense resistor short condition responsive to both the first comparison signal indicating that the sense resistor voltage is less than the first threshold voltage at an expiration of the maximum on-time period and the second comparison signal indicating that the power switch voltage is greater than the second threshold voltage at the expiration of the maximum on-time period;
detecting the low input voltage condition responsive to both the first comparison signal indicating that the sense resistor voltage is less than the first threshold voltage at the expiration of the maximum on-time period and the second comparison signal indicating that the power switch voltage is less than the second threshold voltage at the expiration of the maximum on-time period; and
shutting down operation of the switching power converter in response to the detection of the sense resistor short condition.

10. The method of claim 9, wherein comparing the power switch voltage comprises comparing a voltage across an NMOS power switch transistor.

* * * * *

UNITED STATES PATENT AND TRADEMARK OFFICE
CERTIFICATE OF CORRECTION

PATENT NO. : 10,720,846 B2
APPLICATION NO. : 15/399658
DATED : July 21, 2020
INVENTOR(S) : Guang Feng, Pengju Kong and Juyoung Yoon It is certified that error appears in the above-identified patent and that said Letters Patent is hereby corrected as shown below:

In the Claims

In Column 7, Line 14, change "expiration of the expiration of the the maximum" to --expiration of the maximum--

In Column 7, Line 21, change "the short condition for the sense" to --the short circuit condition for the sense--

Signed and Sealed this
Twenty-ninth Day of December, 2020

Andrei Iancu
*Director of the United States Patent and Trademark Office*